US010387501B2

(12) United States Patent
Luo et al.

(10) Patent No.: US 10,387,501 B2
(45) Date of Patent: *Aug. 20, 2019

(54) GROUPING RECORDS IN BUCKETS DISTRIBUTED ACROSS NODES OF A DISTRIBUTED DATABASE SYSTEM TO PERFORM COMPARISON OF THE GROUPED RECORDS

(71) Applicant: International Business Machines Corporation, Armonk, NY (US)

(72) Inventors: Allan L. Luo, Ontario (CA); Craig W. Muchinsky, Austin, TX (US); Edward B. Thorne, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/599,406

(22) Filed: May 18, 2017

(65) Prior Publication Data

US 2017/0255710 A1    Sep. 7, 2017

Related U.S. Application Data

(63) Continuation of application No. 14/615,218, filed on Feb. 5, 2015, now Pat. No. 9,727,665, which is a (Continued)

(51) Int. Cl.
*G06F 16/00* (2019.01)
*G06F 16/903* (2019.01)
(Continued)

(52) U.S. Cl.
CPC ...... *G06F 16/90344* (2019.01); *G06F 16/122* (2019.01); *G06F 16/24565* (2019.01);
(Continued)

(58) Field of Classification Search
CPC .......................... G06F 17/30985; G06F 16/27
See application file for complete search history.

(56) References Cited

U.S. PATENT DOCUMENTS 5,134,564 A    7/1992  Dunn et al.
5,991,758 A    11/1999 Ellard
(Continued)

OTHER PUBLICATIONS

List of IBM Patents or Patent Applications Treated as Related, Total 2 pp., May 18, 2017.
(Continued)

*Primary Examiner* — Grace Park
(74) *Attorney, Agent, or Firm* — David W. Victor; Konrad, Raynes, Davda and Victor LLP

(57) ABSTRACT

Provided are a computer program product, system, and method for grouping records in buckets distributed across nodes a distributed database system to perform comparison of the grouped records. Upon receiving a record, data in the received record is processed to determine at least one containing bucket having attributes matching those of the received record, wherein the at least one containing bucket comprises at least one of a plurality of buckets, and wherein the buckets are assigned to the local node and the external nodes. A determination is made of at least one of the containing buckets assigned to at least one of the external nodes. At least a portion data in the received record is forwarded to each of the determined at least one external node to perform comparison matching with other records in the containing bucket at the external node.

21 Claims, 5 Drawing Sheets

Related U.S. Application Data continuation of application No. 14/270,368, filed on May 6, 2014, now Pat. No. 9,727,664.

(51) Int. Cl.

| | | |
|---|---|---|
| *G06F 16/27* | (2019.01) | |
| *G06F 16/11* | (2019.01) | |
| *G06F 16/28* | (2019.01) | |
| *G06F 16/951* | (2019.01) | |
| *G06F 16/2455* | (2019.01) | |
| *G06F 16/2457* | (2019.01) | |

(52) U.S. Cl.
CPC ........ *G06F 16/24578* (2019.01); *G06F 16/27* (2019.01); *G06F 16/285* (2019.01); *G06F 16/951* (2019.01)

(56) References Cited

U.S. PATENT DOCUMENTS

| | | | |
|---|---|---|---|
| 7,627,550 | B1 | 12/2009 | Adams et al. |
| 7,685,093 | B1 | 3/2010 | Adams et al. |
| 7,698,268 | B1 | 4/2010 | Adams et al. |
| 2005/0154615 | A1 | 7/2005 | Rotter et al. |
| 2008/0243832 | A1 | 10/2008 | Adams et al. |
| 2008/0243885 | A1 | 10/2008 | Harger et al. |
| 2009/0089332 | A1 | 4/2009 | Harger et al. |
| 2010/0114877 | A1 | 5/2010 | Adams et al. |
| 2010/0153429 | A1 | 6/2010 | Ku et al. |
| 2010/0174725 | A1 | 7/2010 | Adams et al. |
| 2011/0004626 | A1 | 1/2011 | Naeymi-Rad et al. |
| 2011/0055621 | A1 | 3/2011 | Mandagere et al. |
| 2014/0279757 | A1 | 9/2014 | Shimanovsky et al. |

OTHER PUBLICATIONS

Paradies, M. et al, "Entity Matching for Semistructured Data in the Cloud" dated Mar. 26-30, 2012, (online) retrieved from the Internet at URL>http://en.wikipedia.org/wiki/Wikipedia:reference templates, Total 6 pages.

Anonymous, "Distributed Probabilistic Matching", dated Nov. 5, 2013, an IP.com Prior Art Database Technical Disclosure No. IPCOM000232391D, Total 5 pages.

Kolb, L. et al., "Load Balancing for MapReduce-based Entity Resolution", dated Aug. 8, 2011, Database Group, University of Leipzig, Total 12 pages.

Kolb, L. et al., "Dedoop: Efficient Deduplication with Hadoop" dated Aug. 27-31, 2012, Proceedings of the VLDB Endowment, vol. 5, No. 12, Total 4 pages.

U.S. Appl. No. 14/270,368, filed May 6, 2014, invented by Allan L. Luo et al., Total 28 pages.

Preliminary Amendment, dated Feb. 5, 2015, for U.S. Appl. No. 14/270,368, filed May 6, 2014, invented by Allan Luo et al., Total 8 pages.

Office Action, dated Jun. 14, 2016, for U.S. Appl. No. 14/270,368, filed May 6, 2014, invented by Allan Luo et al., Total 22 pages.

Response to Office Action, dated Sep. 14, 2016, for U.S. Appl. No. 14/270,368, filed May 6, 2014, invented by Allan Luo et al., Total 13 pages.

Final Office Action, dated Dec. 12, 106, for U.S. Appl. No. 14/270,368, filed May 6, 2014, invented by Allan Luo et al., Total 12 pages.

Response to Final Office Action, dated Mar. 13, 2017, for U.S. Appl. No. 14/270,368, filed May 6, 2014, invented by Allan Luo et al., Total 10 pages.

Notice of Allowance, dated Mar. 27, 2017, for U.S. Appl. No. 14/270,368 filed May 6, 2014, invented by Allan Luo et al., Total 5 pages.

US Patent Application, dated Feb. 5, 2015, for U.S. Appl. No. 14/615,218, filed Feb. 5, 2015, invented by Allan Luo et al, Total 28 pages.

Office Action, dated Jul. 15, 2016, for U.S. Appl. No. 14/615,218, filed Feb. 5, 2015, invented by Allan Luo et al, Total 16 pages.

Response to Office Action, dated Oct. 17, 2016, for U.S. Appl. No. 14/615,218, filed Feb. 5, 2015, invented by Allan Luo at al, Total 6 pages.

Final Office Action, dated Dec. 12, 2017, for U.S. Appl. No. 14/615,218, filed Feb. 5, 2015, invented by Allan Luo et al, Total 15 pages.

Response to Final Office Action, dated Mar. 13, 2017, for U.S. Appl. No. 14/615,218, filed Feb. 5, 2015, invented by Allan Luo et al, Total 6 pages.

Notice of Allowance, dated Mar. 28, 2017, or U.S. Appl. No. 14/615,218, filed Feb. 5, 2015, invented by Allan Luo et al, Total 5 pages.

Preliminary Amendment, dated Feb. 5, 2015, for U.S. Appl. No. 14/615,218, filed Feb. 5, 2015, invented by Allan Luo et al, Total 7 pages.

GROUPING RECORDS IN BUCKETS DISTRIBUTED ACROSS NODES OF A DISTRIBUTED DATABASE SYSTEM TO PERFORM COMPARISON OF THE GROUPED RECORDS

BACKGROUND OF THE INVENTION

1. Field of the Invention

The present invention relates to a computer program product, system, and method for grouping records in buckets distributed across nodes a distributed database system to perform comparison of the grouped records.

2. Description of the Related Art

To compare data records in a database to determine a relationship value of the records, the database server may have to pair wise compare each possible pair of records. For large scale databases, such a comparison operation, which is computationally expensive, may require a substantial amount of computing resources to calculate the results in a timely fashion.

Prior art includes a candidate selection technique where candidate records are preprocessed and analyzed in order to place each into 0-n bucket groups. Once the buckets have been identified, the records associated with each individual bucket are pair-wise compared against each other using a probabilistic matching algorithm to determine the match score for the pair. The data that is used during the detailed comparison step is referred to as the comparison data. In existing probabilistic matching systems, the candidate comparison processor accesses a centralized repository, like a database or file-system, to retrieve the candidate record comparison data for the records that belong to the bucket being processed, which creates a bottleneck at the repository.

There is a need in the art for improved techniques to cross compare large data sets.

SUMMARY

Provided are a computer program product, system, and method for grouping records in buckets distributed across nodes a distributed database system to perform comparison of the grouped records. Upon receiving a record, data in the received record is processed to determine at least one containing bucket having attributes matching those of the received record, wherein the at least one containing bucket comprises at least one of a plurality of buckets, and wherein the buckets are assigned to the local node and the external nodes. A determination is made of at least one of the containing buckets assigned to at least one of the external nodes. At least a portion data in the received record is forwarded to each of the determined at least one external node to perform comparison matching with other records in the containing bucket at the external node.

DETAILED DESCRIPTION

Described embodiments provide techniques to group records distributed across nodes in a database in buckets, where the buckets are distributed across the database nodes. This distribution of records to buckets and buckets to nodes distributes the comparison operations by having different nodes perform the comparison operation for the records grouped in the buckets assigned to the nodes.

Figure 1:
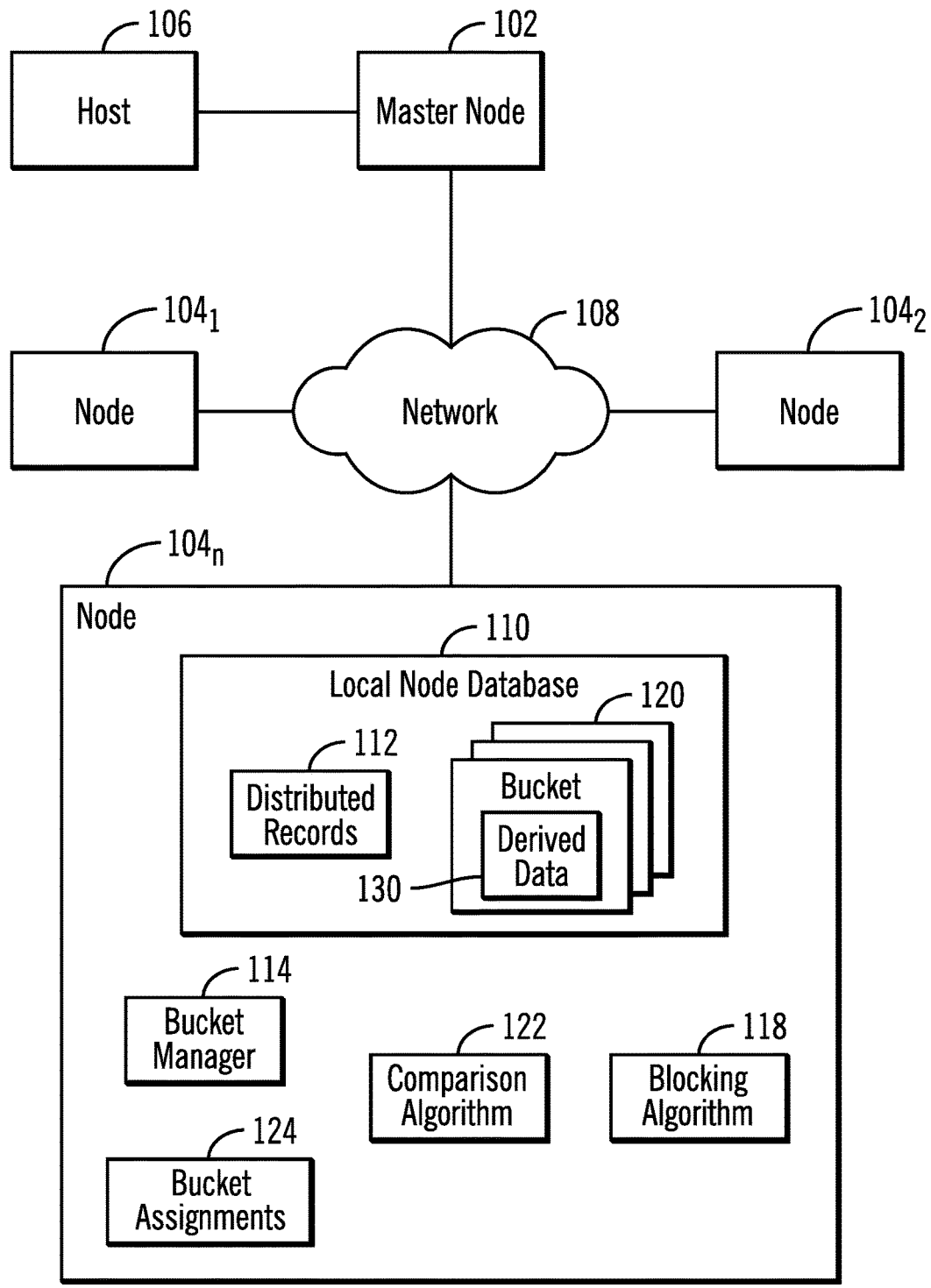
FIG. 1 illustrates an embodiment of a distributed database environment.

FIG. 1 illustrates an embodiment of a distributed database environment 100 including a master node 102 and a plurality of distributed database nodes $104_1, 104_2 \ldots 104_n$, in which records in a database are distributed. The master node 2 may manage the assignment of records in the database to the different nodes $104_1, 104_2 \ldots 104_n$. A host 106 may communicate input in the form of updates and data to the records in the database to the master node 102, which then may propagate the updated or new data records to the node $104_1, 104_2 \ldots 104_n$ assigned that record. The master node 102 may assign distributed database node $104_1, 104_2 \ldots 104_n$ a range of keys of database records that the node $104_1, 104_2 \ldots 104_n$ maintains. The master 102 and distributed database nodes $104_1, 104_2 \ldots 104_n$ may communicate over a network 108. The nodes 102 and $104_1, 104_2 \ldots 104_n$ may comprise database servers.

Node $104_n$ shows the components that may be included in each of the nodes $104_1 \ldots 104_n$, including a local node database 110 to store distributed records 112 of the database assigned to the node $104_n$. The local node further includes a bucket manager 114 to generate derived data 300 that comprises a compressed format of the record including metadata on the record, where the derived data 114 may include only some or all of the content from those fields of the record 112 needed to compare with other records to determine a relationship value. In this way, the derived data 114 may not include data from all fields, only those fields needed for comparison purposes to determine a relationship value.

The bucket manager 114 may apply a blocking algorithm 118 to assign data records to buckets 120 based on attributes of the record or derived data 300 of the record matching attributes of the bucket 120. Bucket attributes may be stored with metadata for the bucket 120. The bucket manager 114 may then invoke a comparison algorithm 122 to pair wise compare every record in one bucket 118 with every other record in that same bucket using the derived data to generate a relationship value between every pair of records. Bucket assignments 124 indicate the buckets assigned to the nodes $104_1, 104_2 \ldots 104_n$, where the master node 102 may assign a set of buckets 120 exclusively to each node $104_1, 104_2 \ldots 104_n$, so that the possible buckets that may result from the blocking algorithm 118 are distributed among the nodes $104_1, 104_2 \ldots 104_n$. In this way, the comparison algorithm 122 processing, which is very computationally expensive, is distributed across different processing nodes $104_1, 104_2 \ldots 104_n$ to allow parallel and distributed processing of comparison operations.

A record may be assigned to buckets based on attributes of the record, where a record may be grouped with different buckets having matching attributes distributed on different nodes $104_1, 104_2 \ldots 104_n$. Each node $104_1, 104_2 \ldots 104_n$ having a bucket in which one record is grouped would be provided derived data for that record to use for the comparison operations between the records in one group.

Figure 2:
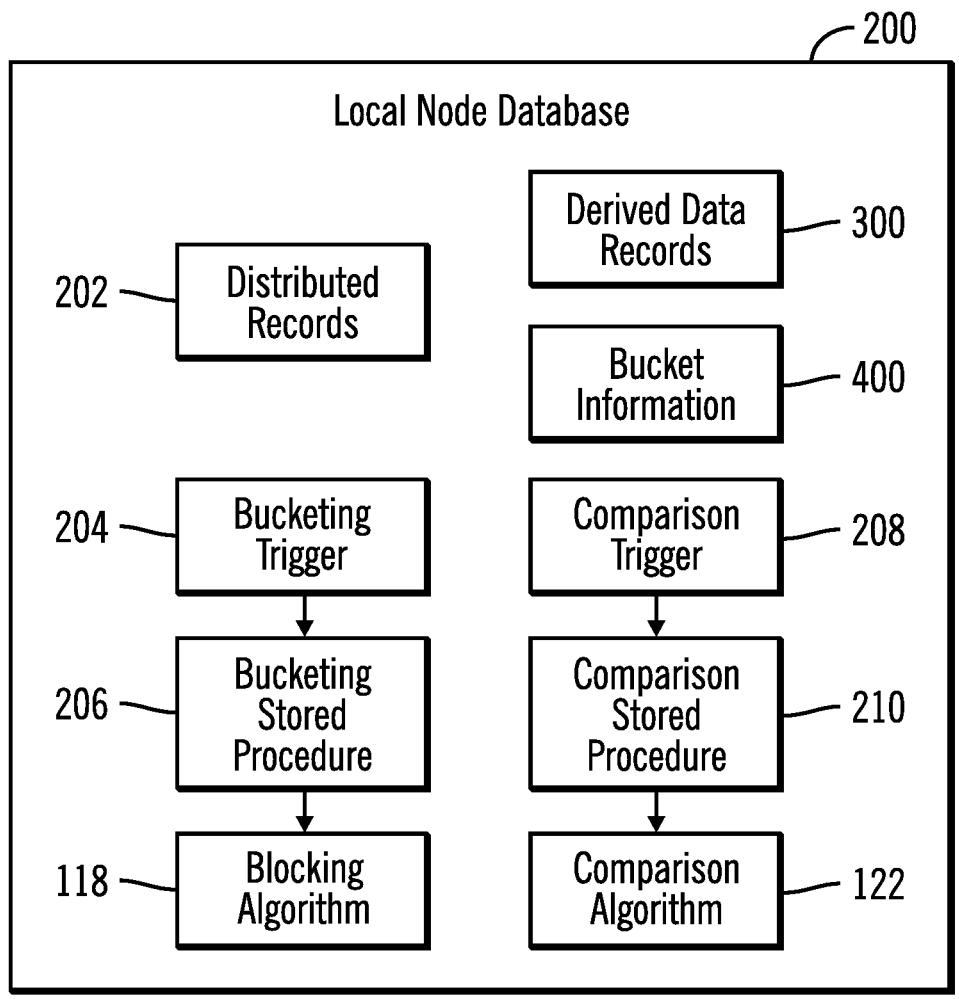
FIG. 2 illustrates an embodiment of an implementation of the components in a local node database.

FIG. 2 illustrates an implementation of the local node database 200, such as local node database 110, as including the distributed records 202, such as records 112, and derived data records 300 providing an implementation of the derived data 300 in a database table. Further, the bucket information 400 comprises bucket records in a database table providing the bucket assignments 122.

FIG. 2 also provides an embodiment of an implementation using database triggers and database stored procedures to manage the bucketing and comparison operations. A database trigger defines a set of actions executed in response to a database event, such as an INSERT, UPDATE or DELETE operation on a specified table. When such an SQL operation is executed, the trigger is said to be activated. The trigger can be activated before the SQL operation or after. A stored procedure contains procedural constructs with Structured Query Language (SQL) and stored in the databases and run on database servers. An application can call a stored procedure by name and run the SQL statements that are included in the stored procedure. The application can be on the client, while the stored procedure executes its logic on the server. Stored procedures and user-defined functions are sometimes referred to collectively as routines.

The local node database 200 may include a bucketing trigger 204, i.e., database trigger, that is triggered in response to an event, such as a record 202, new or modified, being added to the local database 200. The bucketing trigger 204 may then invoke a bucketing stored procedure 206 which executes the blocking algorithm 118 to determine a bucket 120 in which the record should be grouped. The adding of a record to one of the buckets 120 or bucket information 400 may then invoke a comparison trigger 208, comprising a database trigger 208, that invokes a comparison stored procedure 210 to execute the comparison algorithm 122 to perform a pair wise comparison of the derived data 300 for every record grouped in the bucket 120 to determine a relationship strength value for every pair of records in the bucket 120 indicating a relatedness of the records of the compared derived data.

Figures 3, 4:
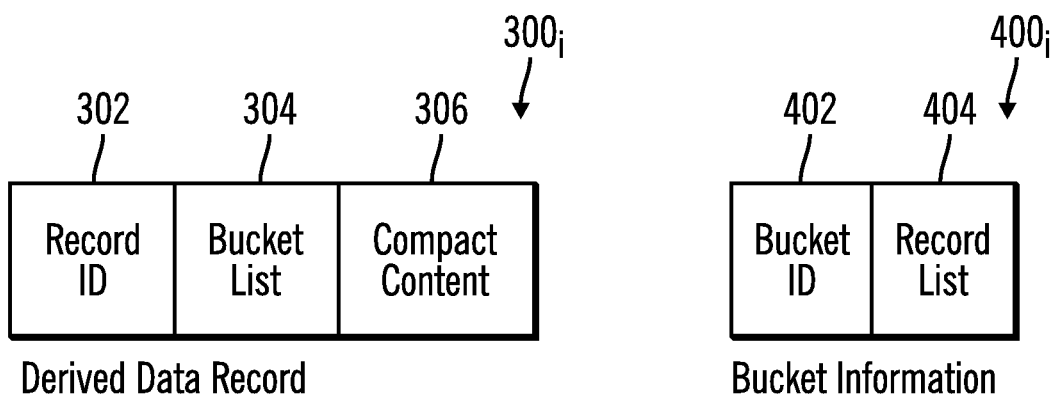
FIG. 3 illustrates an embodiment of a derive data record.
FIG. 4 illustrates an embodiment of bucket information.

FIG. 3 illustrates an embodiment of a derived data record $300_i$ comprising an instance of the derived data 300, including a record identifier (ID) 302 identifying a record 202, a bucket list 304 indicating every bucket across the nodes $104_1, 104_2 \ldots 104_n$ in which the record 302 is grouped, and compact content 306 comprising a portion of the content of the record 302 that is used by the comparison algorithm 122 to compare records. The compact content 306 may include a subset of the fields of the record 302, such as only those fields used by the comparison algorithm 122, and may include an abbreviated format of the included fields. In this way, the derived data $300_i$ provides a compact representation of the record 302.

FIG. 4 illustrates an embodiment of an instance $400_i$ of the bucket information 400 for one bucket identified in the bucket ID 402 and a record list 404 of records grouped with the bucket, such as the record ID or key that can be used to locate the derived data $300_i$ for the record.

Figure 5A:
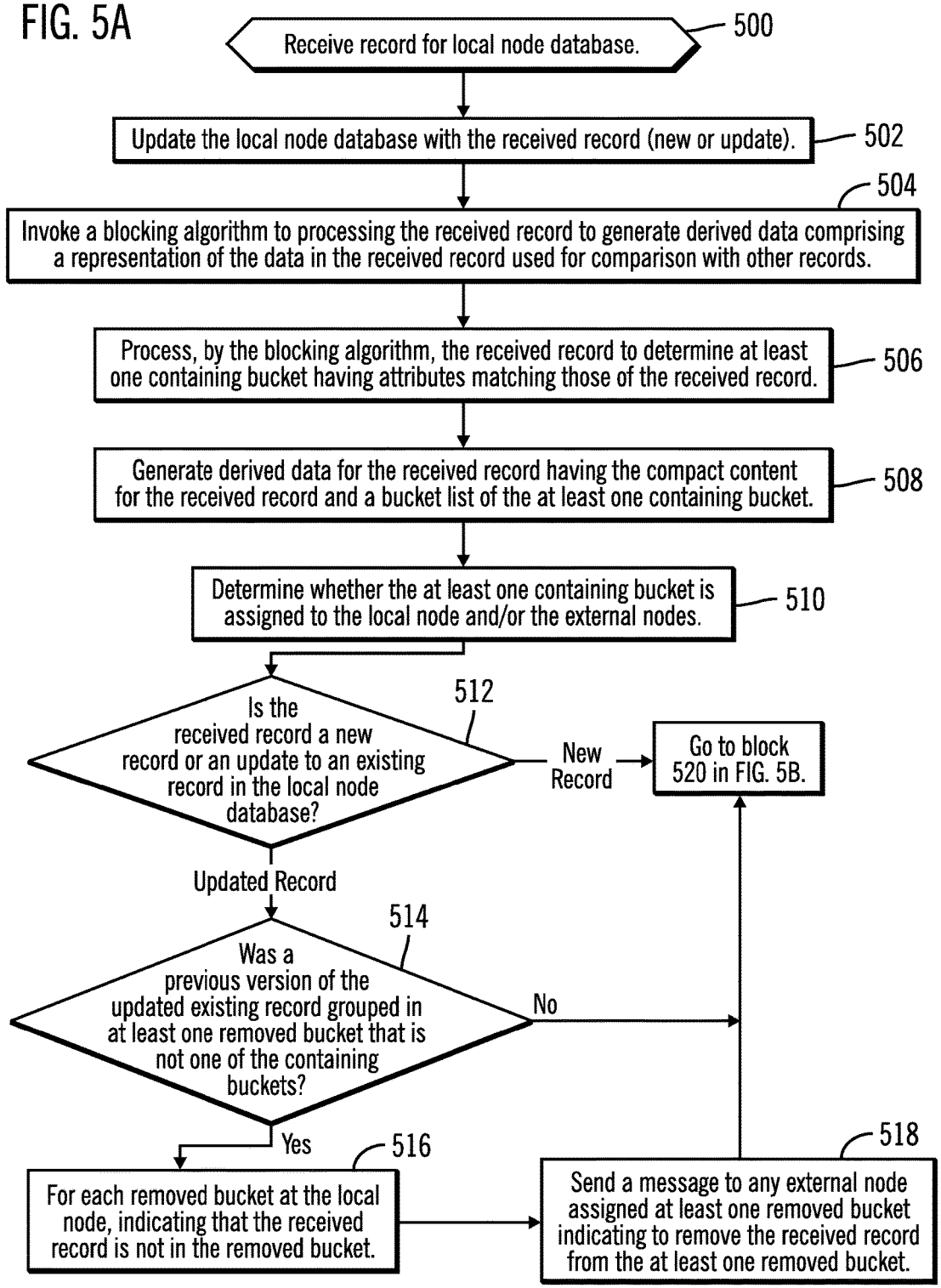
FIGS. 5a and 5b illustrate an embodiment of operations to group data records in buckets.
Figure 5B:
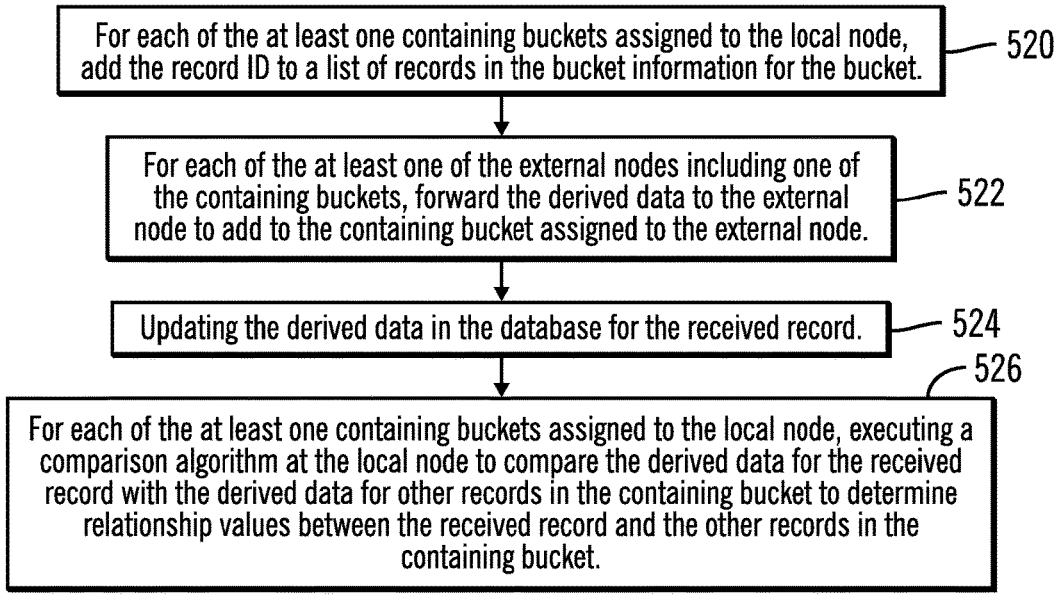

FIGS. 5a and 5b illustrate an embodiment of operations performed by the bucket manager 114 to perform bucketing and comparison operations at the distributed nodes $104_1, 104_2 \ldots 104_n$. Operations described with respect to local node $104_n$ are applicable to operations that may be performed with respect to any of the other nodes $104_1, 104_2 \ldots 104_{n-1}$. The bucket managers 114 at each of the nodes $104_1, 104_2 \ldots 104_n$ may independently perform bucketing and comparison operations. Upon receiving (at block 500) a record for a local node $104_1$ database 110, the local node database 110 is updated (at block 502) with the received record, which may comprise a new record or an update to an existing record. The bucket manager 114 invokes (at block 504) the blocking algorithm 118 to process the received record to generate derived data 300 comprising a representation of the data in the received record used for comparison with other records. The blocking algorithm 118 processes (at block 506) the received record to determine at least one containing bucket having attributes matching those of the received record, where such determined containing buckets may comprise buckets 120 assigned to the local node $104_n$ and/or external nodes $104_1, 104_2 \ldots 104_{n-1}$. Derived data $400_i$ is generated (at block 508) for the received record having the compact content 306 for the received record and a bucket list 304 of the at least one containing bucket. The bucket manager 114, or some other component, determines (at block 510) whether the at least one containing bucket 120 is assigned to the local node $104_n$ and/or the external nodes $104_1, 104_2 \ldots 104_{n-1}$.

If (at block 512) the received record is an update to an existing record in the distributed records 112 of the local node database 110, then the bucket manager 114 determines (at block 514) whether the previous version of the updated existing record was grouped in at least one removed bucket that is not one of the containing buckets, i.e., the bucket grouping has changed so that the updated record is no longer grouped in a bucket, referred to as the removed bucket, in which the pre-updated or pre-existing record was previously grouped. This determination may be made by comparing the bucket list 304 calculated for the updated record with the bucket list 304 for the pre-updated record to determine if a bucket in the bucket list for the pre-updated record is not in the bucket list in the derived data $300_i$ for the updated record. If (from the yes branch of decision 514) there is a removed bucket, then for each removed bucket at the local node $104_n$, the bucket manager 114 indicates (at block 516) that the received record is not grouped with the removed bucket, such as by removing the received record ID from the record list 404 in the bucket information $400_i$ for the removed bucket. Further, a message is sent (at block 518) to any external node $104_1, 104_2 \ldots 104_{n-1}$ assigned at least one removed bucket indicating to remove the received record from the at least one removed bucket.

If (at block 512) the received record is a new record or there is no bucket that grouped the pre-updated record but does not include the updated record (the no branch of block 514) or from block 518, control proceeds to block 520 in FIG. 5b. At block 520, for each of the at least one containing buckets assigned to the local node $104_1$, the record ID of the received record is added to the record list 404 in the bucket information $400_i$ for the containing bucket. If the bucket information $400_i$ for the containing bucket already includes that record ID, then the record list 404 may not be updated. For each of the at least one of the external nodes $104_1, 104_2 \ldots 104_{n-1}$ including one of the containing buckets, the bucket manager 114 may forward (at block 522) the derived data $300_i$ for the record to the external node to add to the containing bucket assigned to the external node. The derived data $300_i$ for the received record may be updated (at block 524) in the local node database 110 with the newly generated derived data.

The comparison algorithm 122 may then be invoked (at block 526), for each of the at least one containing buckets assigned to the local node $104_n$, to compare the derived data $300_i$ for the received record with the derived data for each of the other records in the containing bucket to determine relationship values between the received record and the other records in the containing bucket.

In one embodiment, the bucketing trigger 204 may invoke, in response to receiving the record at block 500, the bucketing stored procedure 206 to perform the operations at blocks 502 through 524. Further, the comparison trigger 208, in response to the bucket information 400 being updated, may invoke the comparison stored procedure 210 to perform the operation at block 526 to determine relationship values in the containing bucket.

Figure 6:
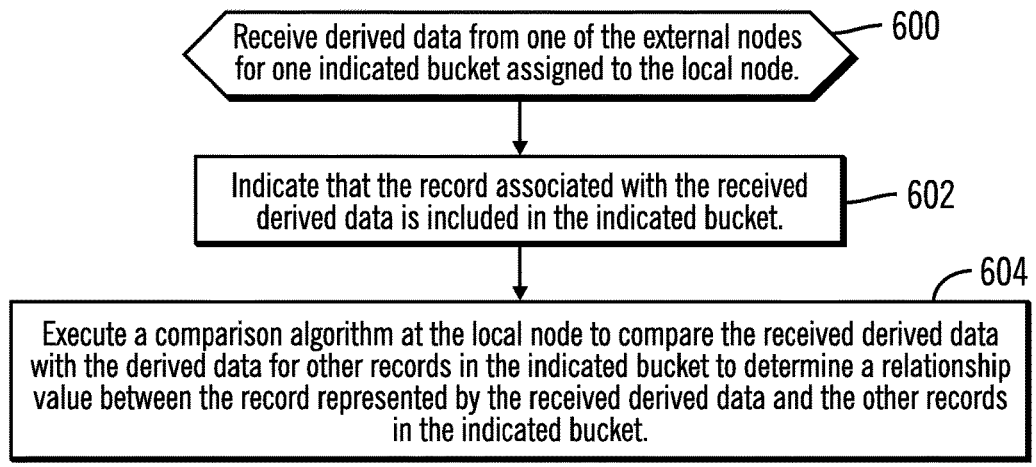
FIG. 6 illustrates an embodiment of operations to process a received derived data record to add to a bucket assigned to the node.

FIG. 6 illustrates an embodiment of operations performed by the bucket manager 114, or the bucketing stored procedure 206, or some other component, in response to receiving (at block 600) derived data $300_i$ from one of the external nodes $104_1$, $104_2$ . . . $104_{n-1}$ for one indicated bucket assigned to the local node $104_n$ receiving the derived data. The bucket manager 114 indicates (at block 602) that the record associated with the received derived data $300_i$ is included in the indicated bucket by updating the record list 404 in the bucket information $400_i$ for the indicated bucket. The bucketing manager 114 or the comparison stored procedure 210 may execute the comparison algorithm 122 at the receiving node to compare the received derived data with the derived data for other records in the indicated bucket to determine a relationship value between the record represented by the received derived data and the other records in the indicated bucket.

Figure 7:
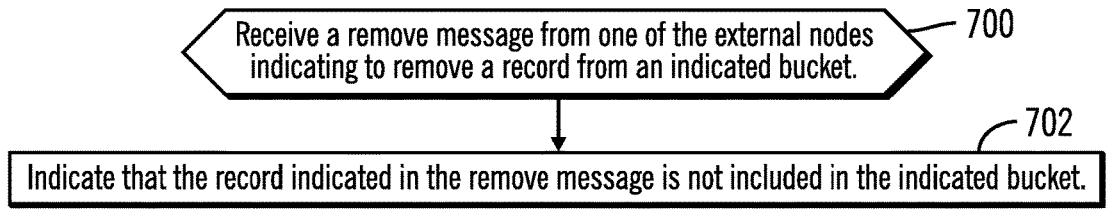
FIG. 7 illustrates an embodiment of operations to remove a database record from a bucket.

FIG. 7 illustrates an embodiment of operations performed by the bucket manager 114, or the bucketing stored procedure 206, or some other component, in response to receiving (at block 700) a remove message from one of the external nodes $104_1$, $104_2$ . . . $104_{n-1}$ indicating to remove a record from an indicated bucket. In response, the bucket manager 114 indicates (at block 702) that the record indicated in the remove message is not included in the indicated bucket, such as by removing the record from the record list 404 in the bucket information $400_i$ for the removed bucket.

Described embodiments provide a distributed database system running efficiently in parallel on an elastic cluster of computing nodes. The described embodiments may be implemented in a high performance cloud computing environment that can efficiently process massive amounts of data (big data) scattered in the cloud. Further, a highly efficient probabilistic matching algorithm minimizes the required computing resources used by the comparison algorithm by generating very limited amount of buckets of data to compare, which reduces network latency. Further, described embodiments provide highly horizontal scalability on the cluster to meet the desired level of performance. Further the described operations may be driven by data change events across data nodes, so that the data blocking and matching are invoked and processed automatically in a parallel manner without the need to be called explicitly.

Described embodiments provide techniques to manage records in a distributed database system, distributed across database servers or nodes, so that records are assigned to one or more buckets, so that records grouped in a bucket are subject to a comparison algorithm that performs pair wise comparison of each pair of records in the bucket to determine a relationship value between each pair of records. In this way, the comparison operations of records are distributed across the distributed database by grouping the records in buckets, which are distributed across the nodes. The database server nodes may separately and in parallel perform comparison operations to determine relationships for the records grouped in their assigned buckets.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i and n, are used herein to denote a variable number of instances of an element, which may represent the same or different values, and may represent the same or different value when used with different or the same elements in different described instances.

Figure 8:
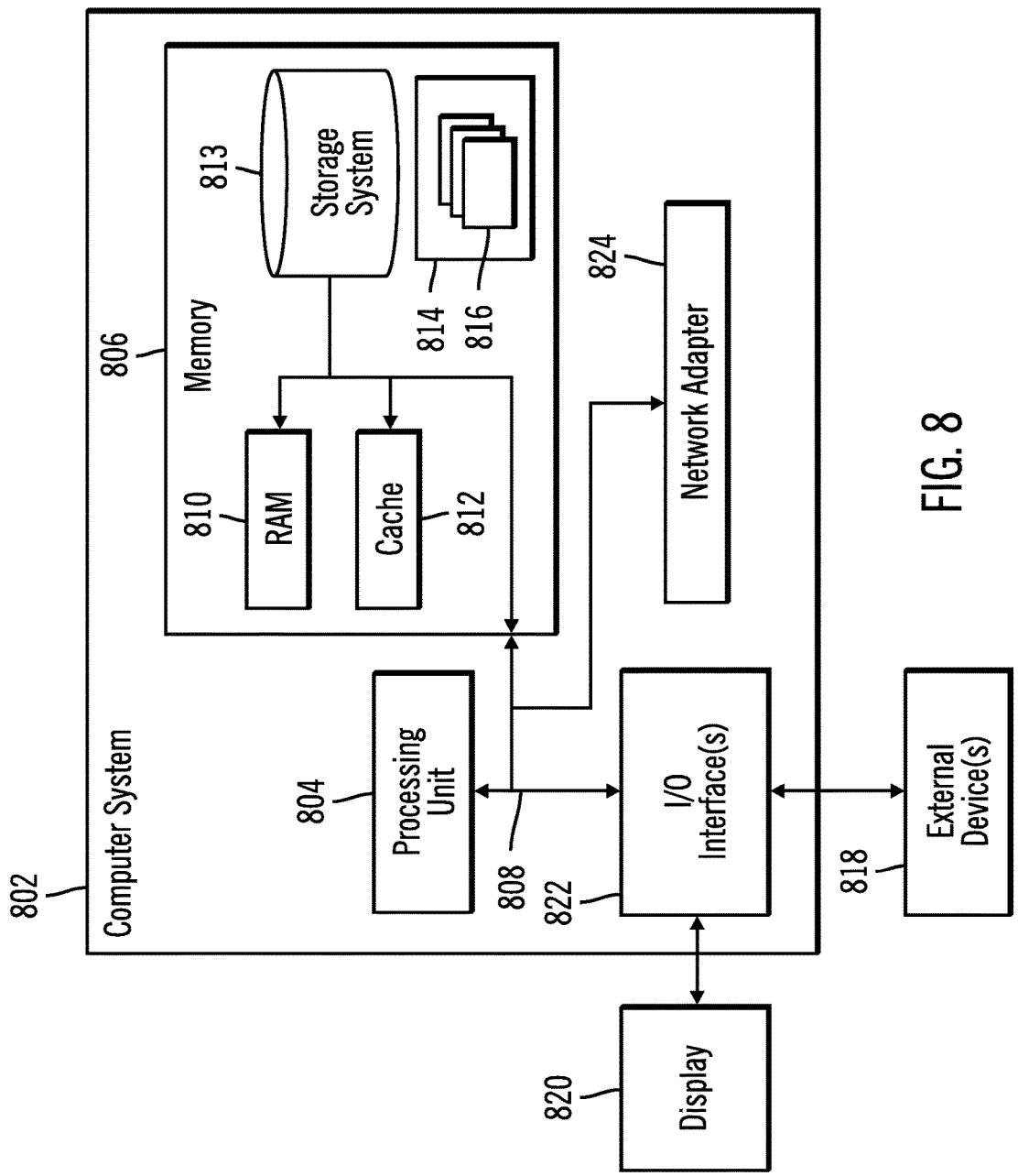
FIG. 8 illustrates an embodiment of an implementation of the database nodes of the described embodiments.

FIG. 8 illustrates an embodiment of a computer system 802 which may comprise an implementation of the nodes $104_1, 104_2 \ldots 104_n$. Computer node 802 is only one example of a suitable computing node and is not intended to suggest any limitation as to the scope of use or functionality of embodiments of the invention described herein. Regardless, computer node 802 is capable of being implemented and/or performing any of the functionality set forth hereinabove.

The computer node 802 is operational with numerous other general purpose or special purpose computing system environments or configurations. Examples of well-known computing systems, environments, and/or configurations that may be suitable for use with computer node 802 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 802 may be described in the general context of computer system executable instructions, such as program modules, being executed by a computer system. Generally, program modules may include routines, programs, objects, components, logic, data structures, and so on that perform particular tasks or implement particular abstract data types. Computer node 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 802 is shown in the form of a general-purpose computing device. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 802 typically includes a variety of computer system readable media. Such media may be any available media that is accessible by computer node 802, and it includes both volatile and non-volatile media, removable and non-removable media, and may be used for storing the programs and data used by the programs.

System memory 806 can include computer system readable media in the form of volatile memory, such as random access memory (RAM) 810 and/or cache memory 812. Computer node 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules etc., and program data. Each of the operating system, one or more application programs, other program modules, and program data or some combination thereof, may include an implementation of a networking environment. Program modules 816 generally carry out the functions and/or methodologies of embodiments of the invention as described herein.

Computer node 802 may also communicate with one or more external devices 818 such as a keyboard, a pointing device, a display 820, etc.; one or more devices that enable a user to interact with the computer node 802; and/or any devices (e.g., network card, modem, etc.) that enable computer system/server 802 to communicate with one or more other computing devices. Such communication can occur via Input/Output (I/O) interfaces 822. Still yet, computer node 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining a relationship of records in a database distributed among nodes in a network, the computer program product comprising a computer readable storage medium having computer readable program code embodied therein that when executed in a local node in communication with external nodes performs operations, the operations comprising:
  receiving a record in the database at the local node;
  processing data in the received record to determine containing buckets in the local node and at least one of the external nodes having attributes matching those of the received record;
  forwarding at least a portion of data in the received record to each external node including one of the determined containing buckets to perform comparison matching with other records in the determined at least one containing bucket at the external node to determine relationship strength values of the portion of data in the received record with each of records in the containing bucket;
  processing the received record in the determined at least one containing bucket at the local node in response to the local node including one of the determined at least one containing bucket; and
  executing a comparison algorithm at the local node to compare data for at least a portion of the received record with each of records in the at least one containing bucket to determine relationship strength values between the received record and the records in the at least one containing bucket with which the received record is compared, wherein the comparison matching of records is distributed across the nodes of the network over which the database is distributed to in parallel perform the comparison matching of records across the nodes of the network to determine relationship strength values.

2. The computer program product of claim 1, wherein the operations further comprise:
processing the received record to generate derived data comprising a compact representation of the data in the received record including content for less than all fields in the received record and including content used for comparing the derived data with derived data for other records assigned to one of the containing buckets to determine the relationship strength values for the compared records, wherein the forwarded at least the portion of data in the received record comprises the derived data.

3. The computer program product of claim 1, wherein the operations further comprise:
for each containing bucket of the determined at least one containing bucket assigned to the local node, executing a comparison algorithm at the local node to compare at least a portion of data in the received record with at least a portion of data for other records in the containing bucket to determine the relationship strength values between the received record and the other records in the containing bucket.

4. The computer program product of claim 1, wherein the operations further comprise:
generating a bucket list for the received record indicating the determined at least one containing bucket including the received record.

5. The computer program product of claim 4, wherein the operations further comprise:
forwarding the bucket list to each of the external nodes assigned one of the determined at least one containing bucket.

6. The computer program product of claim 1, wherein the operations further comprise:
receiving data for one record from one of the external nodes for one indicated containing bucket assigned to the local node; and
indicating that the record associated with the received data is included in the indicated containing bucket.

7. The computer program product of claim 1, wherein the operations further comprise:
receiving a message from one of the external nodes indicating to remove a record from an indicated containing bucket; and
indicating that the record indicated in the message to remove is not grouped in the indicated containing bucket.

8. The computer program product of claim 1, wherein the database of records is distributed across the nodes, wherein each node includes a node database to store a subset of records in the database, wherein the operations further comprise:
invoking a bucketing database trigger in the node database in the local node in response to receiving the record; and
invoking, by the bucketing database trigger, a bucketing stored procedure in the node database at the local node to perform the operations of processing the data in the received record to determine the containing buckets, and forwarding the data.

9. The computer program product of claim 8, wherein the operations further comprise:
invoking a comparison database trigger in the node database in the local node in response to the bucketing stored procedure determining that a containing bucket of the at least one containing bucket is assigned to the local node; and
invoking, by the comparison database trigger, a comparison stored procedure in the node database in the local node to compare derived data for the received record with derived data for other records grouped in the containing bucket assigned to the local node to determine relationship values between the received record and the other records grouped in the containing bucket.

10. A system for determining a relationship of records in a database distributed among nodes in a network, comprising:
a processor at a local node in the network in communication with external nodes of the nodes; and
a computer readable storage medium having program code executed by the processor to perform operations at the local node, the operations comprising:
receiving a record in the database at the local node;
processing data in the received record to determine containing buckets in the local node and at least one of the external nodes having attributes matching those of the received record;
forwarding at least a portion of data in the received record to each external node including one of the determined containing buckets to perform comparison matching with other records in the determined at least one containing bucket at the external node to determine relationship strength values of the portion of data in the received record with each of records in the containing bucket;
processing the received record in the determined at least one containing bucket at the local node in response to the local node including one of the determined at least one containing bucket; and
executing a comparison algorithm at the local node to compare data for at least a portion of the received record with each of records in the at least one containing bucket to determine relationship strength values between the received record and the records in the at least one containing bucket with which the received record is compared, wherein the comparison matching of records is distributed across the nodes of the network over which the database is distributed to in parallel perform the comparison matching of records across the nodes of the network to determine relationship strength values.

11. The system of claim 10, wherein the operations further comprise:
generating a bucket list for the received record indicating the determined at least one containing bucket at the external nodes including the received record.

12. The system of claim 11, wherein the operations further comprise:
forwarding the bucket list to each of the external nodes assigned one of the determined at least one containing bucket.

13. The system of claim 10, wherein the operations further comprise:
processing the received record to generate derived data comprising a compact representation of the data in the received record including content for less than all fields in the received record and including content used for comparing the derived data with derived data for other records assigned to one of the containing buckets to determine the relationship strength values for the compared records, wherein the forwarded at least the portion of data in the received record comprises the derived data.

14. The system of claim 10, wherein the operations further comprise:
for each containing bucket of the determined at least one containing bucket assigned to the local node, executing a comparison algorithm at the local node to compare at least a portion of data in the received record with at least a portion of data for other records in the containing bucket to determine the relationship strength values between the received record and the other records in the containing bucket.

15. The system of claim 10, wherein the operations further comprise:
receiving data for one record from one of the external nodes for one indicated containing bucket assigned to the local node; and
indicating that the record associated with the received containing data is included in the indicated containing bucket.

16. A method for determining a relationship of records distributed among nodes in a network, comprising:
receiving a record in a database at a local node;
processing data in the received record to determine containing buckets in the local node and at least one of the external nodes having attributes matching those of the received record;
forwarding at least a portion of data in the received record to each external node including one of the determined containing buckets to perform comparison matching with other records in the determined at least one containing bucket at the external node to determine relationship strength values of the portion of data in the received record with each of records in the containing bucket;
processing the received record in the determined at least one containing bucket at the local node in response to the local node including one of the determined at least one containing bucket; and
executing a comparison algorithm at the local node to compare data for at least a portion of the received record with each of records in the at least one containing bucket to determine relationship strength values between the received record and the records in the at least one containing bucket with which the received record is compared, wherein the comparison matching of records is distributed across the nodes of the network over which the database is distributed to in parallel perform the comparison matching of records across the nodes of the network to determine relationship strength values.

17. The method of claim 16, further comprising:
generating a bucket list for the received record indicating the determined at least one containing bucket at the external nodes including the received record.

18. The method of claim 17, further comprising:
forwarding the bucket list to each of the external nodes assigned one of the determined at least one containing bucket at the external nodes.

19. The method of claim 16, further comprising:
processing the received record to generate derived data comprising a compact representation of the data in the received record including content for less than all fields in the received record and including content used for comparing the derived data with derived data for other records assigned to one of the containing buckets to determine the relationship strength values for the compared records, wherein the forwarded at least the portion of data in the received record comprises the derived data.

20. The method of claim 16, further comprising:
for each containing bucket of the determined at least one containing bucket assigned to the local node, executing a comparison algorithm at the local node to compare at least a portion of data in the received record with at least a portion of data for other records in the containing bucket to determine the relationship strength values between the received record and the other records in the containing bucket.

21. The method of claim 16, further comprising:
receiving data for one record from one of the external nodes for one indicated containing bucket assigned to the local node; and
indicating that the record associated with the received data is included in the indicated containing bucket.

* * * * *